Sept. 10, 1968  E. O. SCHULZ-DU BOIS  3,401,360
PHASED TRANSDUCER ARRAYS FOR ELASTIC WAVE TRANSMISSION
Filed Sept. 13, 1965  2 Sheets-Sheet 2

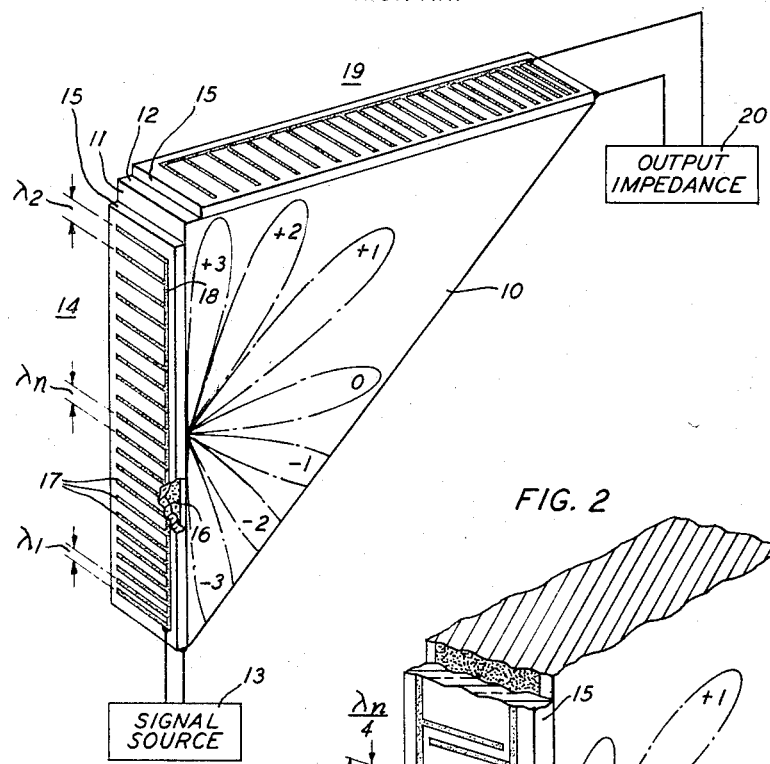
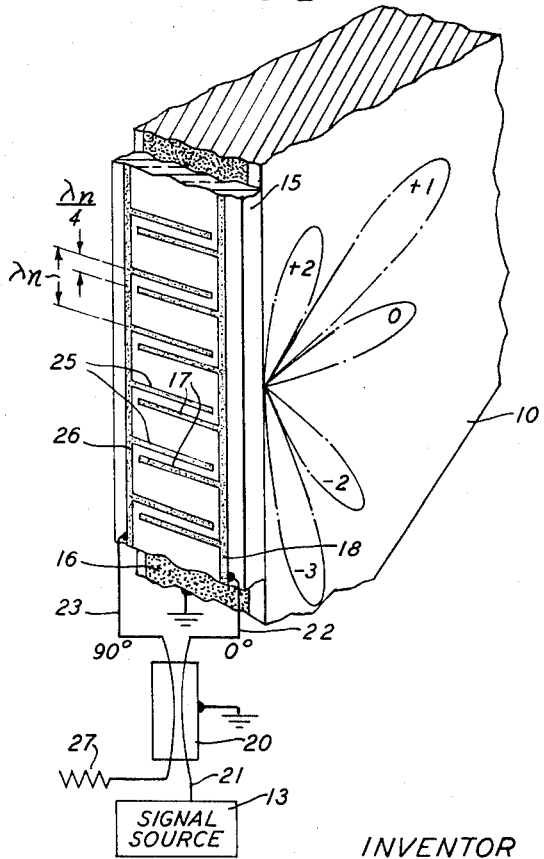

United States Patent Office 3,401,360
Patented Sept. 10, 1968

3,401,360
PHASED TRANSDUCER ARRAYS FOR ELASTIC WAVE TRANSMISSION
Erich O. Schulz-Du Bois, Oldwick, N.J., assignor to Bell Telephone Laboratories, Incorporated, New York, N.Y., a corporation of New York
Filed Sept. 13, 1965, Ser. No. 486,900
7 Claims. (Cl. 333—30)

This invention relates to elastic wave transducers and more particularly to transducers having multiple arrays of electrodes which enhance, suppress or direct certain lobes of elastic wave radiation. In a more specific aspect, the invention relates to improved elastic wave delay devices having special delay versus frequency or signal dispersion characteristics.

In the prior art, transducers having a plurality of electrodes arranged in an array have been used to launch an input wave such that different frequency components are radiated with different dispersion angles along paths having different path lengths, toward a similar output transducer which accepts the incident signals and combines the frequency components in a way which preserves the introduced delay. Examples of this prior art may be found in British Patent 988,102, of W. S. Mortley, published Apr. 7, 1965, or in the copending applications of R. S. Duncan and M. R. Parker, Ser. No. 296,212, filed July 19, 1963, M. R. Parker, Ser. No. 374,544, filed June 11, 1964, E. K. Sittig, Ser. No. 417,027, filed Dec. 9, 1964, now Patent No. 3,360,749, and E. K. Sittig, Ser. No. 419,505, filed Dec. 18, 1964.

It has been recognized that the series of dispersion angles for each frequency produces not only the useful first order lobe of the radiation pattern of the array, but also produces undesired higher order lobes for each individual frequency. It is therefore desirable to minimize these higher order lobes since the power lost to them increases the insertion loss of the device. Furthermore, since energy in the higher order lobes arrives at the output array after multiple reflections from the boundaries of the delay medium, rejection of spurious signals is made difficult.

It is therefore an object of the present invention to enhance and direct energy in desired lobes of radiation from multiple-electrode transducers and to simultaneously decrease undesired transmission lobes.

In accordance with the present invention a transducer is formed by locating upon one surface of a piezoelectric member at least two arrays of interlaced electrodes spaced so that adjacent electrodes of the respective arrays are separated by one-quarter wavelength or odd multiples thereof and then driving the arrays with respect to a common electrode upon the opposite surface of the member in phases that are displaced from each other 90° or odd multiples thereof. In one embodiment a double array is employed to suppress the first order lobe in one direction. In another embodiment a quadruple array is employed to suppress all even order lobes as well as the negative first order lobe. In a further embodiment, the last-mentioned result is obtained by a substantially simplified structure comprising an abbreviated quadruple array.

These and other objects and features, the nature of the present invention and its various advantages, will appear more fully upon consideration of the specific illustrative embodiments shown in the accompanying drawings and described in detail in the following explanation of these drawings, in which:

FIG. 1 is a perspective view of a multiple-electrode transducer of the prior art utilized as part of a dispersive delay line;

FIG. 2 illustrates a modification of FIG. 1 to provide a double array multiple-electrode transducer in accordance with the principles of the present invention;

Figure 3:
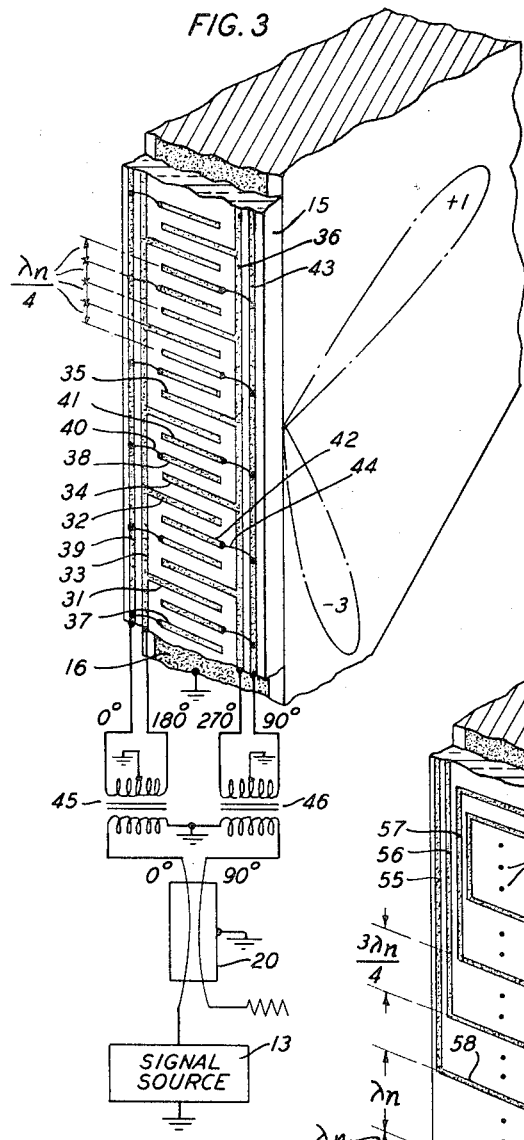
FIG. 3 illustrates a further modification of FIG. 1 to provide a quadruple array multiple-electrode transducer in accordance with the principles of the present invention.

The principles of the present invention will most easily be understood by first considering a multiple-electrode transducer as employed by the prior art and more particularly by considering this transducer as applied in its most common application to a dispersive delay line.

Referring therefore to FIG. 1, such a transducer 14 comprises a thin member 15 of crystal or ceramic piezoelectric material that is poled to produce vibration when a voltage is applied across its thickness by suitable electrodes in any mode familiar to the art such as that conventionally designated as the thickness shear mode. The electrodes comprise a first single conductive common electrode 16 located upon one surface of member 15 and a comb-like or ladder-like electrode array 17–17–18 located upon the opposite surface of member 15. Such an electrode array may be formed by plating a uniform layer of conductive material over the entire face of member 15 and then etching away portions of it to leave a large plurality, in a practical case numbering from several hundred to several thousand, electrodes 17—17 in the form of transversely extending conductive bars or crosspieces which are electrically tied together by at least one side rail 18. Thus all electrodes 17—17 are connected in parallel to one side of source 13 while electrode 16 is connected to the other side thereof.

The spacing between the centers of adjacent electrodes 17—17 varies with distance along the length of the array according to the function which it is desired to reproduce as the frequency versus delay characteristic in the output energy. More particularly, this spacing is generally one wavelength $\lambda_1$ and $\lambda_2$ at the highest and lowest frequencies, respectively, in the applied band at the ends of the array, and varies through some intermediate wavelength $\lambda_n$ according to a relationship which may be linear or which may vary according to any geometric, exponential, logarithmic or other progression which represents the desired dispersive variation. Theoretically, each electrode should have a dimension parallel to the longitudinal extent of the array determined by a particular dispersion pattern but in a practical case it has been found that a uniform dimension less than one-half wavelength of the highest frequency under consideration is satisfactory and is substantially more easily formed. In the particular application illustrated in which transducer 14 is employed as a part of a dispersive delay line, transducer 14 is bonded to the left-hand face 11 of a flattened, basically wedge-shaped block 10 of any suitable ultrasonic propagation material. For example, block 10 may be formed of an isotropic material, such as glass or vitreous silica, or a metal alloy of grain size small compared to the wavelength of the elastic wave to be carried. Block 10 has front and back plane surfaces that are substantially parallel and are spaced apart by a transverse dimension sufficient that these surfaces do not materially interfere with propagation of the desired mode. Left-hand face 11 and top face 12 are at right angles to each other and have longitudinal dimensions in directions normal to the transverse dimension of block 10 that are each between several hundred and several thousand ultrasonic wavelengths.

A multiple-electrode transducer 19, which may be substantially identical to transducer 14, is located upon surface 12 with the array electrodes or greater spacing nearer to transducer 14. Transducer 19 is connected to output impedance or utilizing device 20. The remaining faces of block 10 are not critical and truncation to form the wedge simplifies packaging and economizes on materials. Preferably, the truncated face is provided with an acoustical absorber of known type which aborbs and dissipates without reflection any acoustical energy reaching it.

While a detailed analysis of operation may be obtained by reference to the above-noted copending application of Duncan and Parker, sufficient understanding for the purposes of the present disclosure may be had by considering the diffraction pattern emanating from a localized group of the array of electrodes 17—17 at a particular frequency. This diffraction pattern is schematically illustrated on the drawing by the broken lines superimposed on body 10 and comprises a zeroth main lobe progressing normally from the grating, together with positive and negative first, second and third order side lobes each having angles of emergence which depend on the array spacing relative to frequency. In order to simplify the comparison to be made hereinafter, all lobes are shown as having the same amplitude which is the case only in an array of infinite length and infinite fineness. In reality the higher order lobes drop off progressively in amplitude. However, techniques in accordance with the invention which decrease the amplitude of the higher order lobes in the idealized case will proportionally reduce them in an actual embodiment.

In the contemplated dispersive delay line application only the positive first order lobe directed toward transducer 19 is utilized. Transducer 19 in turn has a first order lobe in its receiving pattern that coincides with the transmitted lobe. At one frequency then a particular pair of electrodes in transducer 14 will produce maximum response in transducer 19 because at that frequency the first order lobe of transducer 14 will coincide with the first order receiving lobe of transducer 19. At some higher frequency, another pair of electrodes more closely spaced will produce coinciding first order lobes, but at the higher frequency the path traveled to the receiving array is longer than at the lower frequency. The net result is a delay versus frequency characteristic which varies with frequency in the desired manner.

The presence of the zeroth order lobe, negative order lobes and positive lobes other than the first is undesirable. Satisfactory performance has been obtained in the prior art devices only after careful location of the transducers to accentuate the response to the first order lobe and by judicious use of dissipation in and around the body of delay medium 10 to dissipate the other lobes. However, the presence of these lobes causes substantial loss of power, and they are potential sources of undesired spurious signals, echoes and noise.

In accordance with a first embodiment of the present invention the negative first order lobe is canceled, the zeroth and all even order lobes are reduced by substantially one-half by means of the double electrode array shown in FIG. 2. FIG. 2 represents an enlarged view of a portion of the center region of the input transducer 14 and a part of body 10 of FIG. 1 modified in accordance with the present invention. Corresponding reference numerals having been employed to represent corresponding components and modification will be seen to reside in the introduction of an additional electrode array having transversely extending electrodes 25—25 each interleaved between the electrodes 17—17 of the first array and respectively spaced one-quarter wavelength or an odd multiple thereof away from each electrode 17 in the direction of propagation of the desired positive first order lobe. Successive electrodes of the same array are still spaced one wavelength. Electrodes 25 are then electrically tied together by conductive side rail 26.

The two arrays are fed with a voltage applied between side rail 26 and common electrode 16 that lags by 90° the voltage applied between side rail 18 and common electrode 16. This phasing is achieved in accordance with a preferred embodiment by the use of a suitable 3 db quadrature hybrid or directional coupler 20. Many alternative versions of this component are known to the art. All, however, have four branches in which power applied to one divides equally with a 90° phase shift between two other branches while a balance is maintained with respect to the fourth. Illustrative, but by no means exclusive, examples of quadrature hybrids at frequencies below those typically using waveguides are shown by B. C. Bellows in Patent 2,679,632, May 25, 1954 and B. M. Oliver in Patent 2,775,740, Dec. 25, 1956. Typical examples of directional couplers operating at microwave frequencies in conductive bounded waveguides may be found in the article by S. E. Miller, "Coupled Wave Theory and Waveguide Applications," 33 BSTJ 661, May 1954, or in the patents of H. J. Riblet, 2,739,287 and 2,739,288, Mar. 20, 1956.

In FIG. 2 the schematically represented circuit 20 is intended to designate any of the foregoing types or their equivalents. One branch 21 of circuit 20 is driven from source 13. The branch 22 which is in phase with driven branch 21 is connected to array 17–18 while the branch 23 which lags branches 21 and 22 by 90° is connected to array 25–26. The remaining branch may be terminated in its characteristic impedance 27.

The resulting lobe characteristics are illustrated by the broken lines superimposed on body 10 indicating the absence of the −1 lobe and the reduction of the 0, +2, and −2 lobes by one-half. The validity of this lobe pattern can be verified qualitatively by recognizing that each array will individually excite patterns having lobes as illustrated in FIG. 1. The individual patterns are both separated in time by 90° and displaced in space by one-quarter wavelength from each other. For propagation along the +1 direction equal 90° phase shifts of the same sign are introduced to both patterns so that they combine constructively. Along the −1 direction the two 90° phase shifts appear with opposite signs in the patterns so that the lobes combine out-of-phase to produce destructive interference. Along the direction of even order lobes the destructive interference is partial.

The lobe pattern is further improved by the quadruple array arrangement shown in FIG. 3 comprising four separately fed interleaved arrays spaced one-quarter wavelength apart and fed in phases 90° apart. A first electrode array may be identified as comprising every fourth conductive crosspiece such as 31 and 32 spaced one wavelength and interconnected by side rail 33, a second electrode array as comprising the next set of every fourth crosspiece such as 34 and 35 interconnected by side rail 36, a third electrode array comprising another set of crosspieces such as 37 and 38 interconnected by way of jumpers 40 to side rail 39, and a final electrode array comprising the remaining crosspieces such as 41 and 42 interconnected by way of jumpers 44 to side rail 43. While jumpers 40 and 44 may be wired connections as illustrated they are preferably formed in practice by utilizing techniques well known in the printed circuit art. Thus all conductive crosspieces and side rails are first formed upon one surface of piezoelectric member 15 as described hereinbefore. An insulating layer is then formed over the inner side rails 33 and 36. Conductive jumpers 40 and 44 are then formed as conductive overlays over the insulating layers to connect between appropriate crosspieces and the outer side rails 39 and 43.

The four arrays are driven from quadrature hybrid circuit 20 through interposed circuit means for deriving further inphase and out-of-phase components from both the 0° and 90° outputs of circuit 20 to produce phases 0°, 180°, 90°, and 270°. A pair of transformers 45 and 46 each having center taps connected to common electrode 16 are adequate at low frequencies and at microwave frequencies a pair of 180° 3 db hybrids or magic T may be used. The arrays are connected so that successively delayed phases are applied to succeeding electrodes along the direction of propagation of the desired positive lobe.

The improvement over the array of FIG. 2 made possible by this arrangement may be qualitatively understood by recognizing that the array 37–38–39 together with the array 41–42–43 produces the lobe pattern described in FIG. 2. The remaining pair of arrays produces virtually the same radiation pattern but, being driven out-of-phase with respect to the first pair, produces even order lobes that cancel while the odd order lobes add. Thus only the +1 lobe together with the —3 lobe remains.

The problem of physically constructing the many closely spaced electrodes along with their overlay connections becomes more difficult as the frequency of intended operation is increased. Some simplification can be provided by arranging the four arrays in a side-by-side relationship. The desired interaction between lobes produced by the separate arrays continues to exist in the far field where their radiation patterns overlap.

Figure 4:
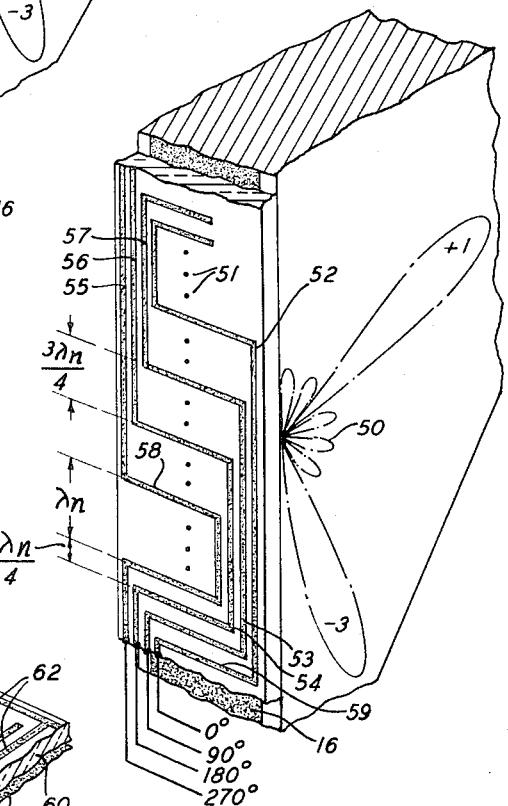
FIG. 4 illustrates an abbreviated and simplified version of the quadruple array of FIG. 3.

FIG. 4, however, illustrates a preferred form of simplification obtained at the expense of producing some spurious signals. Comparing FIG. 4 with FIG. 3 it will be seen that certain of the conductive crosspieces from each of the arrays of FIG. 3 have been omitted in FIG. 4, the location of those omitted being indicated by the dots 51. The crosspieces which remain are those which can easily be interconnected by side rails 52, 53, and 54 on one side and by a similar set 55, 56 and 57 on the other in a serpentine fashion. Successive crosspieces of the same array are spaced one wavelength or a multiple thereof and adjacent crosspieces of different arrays are spaced on odd multiple of quarter wavelength and are excited in the same phases as they were in FIG. 3. Note, for example, that conductive crosspiece 58 corresponds to conductive crosspiece 34 of FIG. 3, both being excited by the voltage 270° behind the voltage applied to crosspieces 59 and 37, respectively, spaced in each case seven quarter wavelengths away. Calculations have indicated that spurious responses of low amplitude are produced at angles spaced at multiples of one-fifth of the original response angles, as schematically indicated by the minor lobes 50. Since, however, the electrode pattern may be produced by a single etch process, the disadvantage of the spurious response is outweighed by the mechanical simplification.

According to one aspect, the principles of the invention illustrate how an elastic wave transducer, including a phased array of electrodes, can be made to have directional properties. Essentially this is illustrated in any of FIGS. 2, 3, and 4 by the presence of the +1 lobe and the absence of the —1 lobe. This principle is applied with particular advantage in FIG. 5 to a delay line employing a Rayleigh surface wave in a piezoelectric member in the form described in the copending application of J. H. Rowen, Ser. No. 333,022, filed Dec. 24, 1963, now Patent No. 3,289,114.

Figure 5:
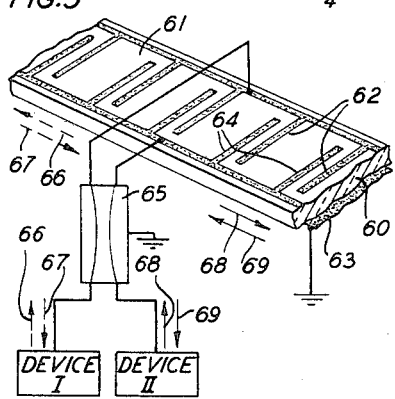
FIG. 5 illustrates how the principles of the invention may be applied to other forms of delay medium.

As disclosed by Rowen, a Rayleigh wave propagating along a surface 61, referred to as the vibrating surface, in a plate 60 of piezoelectric material may be launched or detected by a plurality of electrodes 62—62 distributed upon surface 61 to form one terminal while the other terminal is formed by an extended ground electrode 63 upon the opposite dead surface. Such an array couples to the surface wave which has a particle displacement that generates a piezoelectric field normal to the plane of the electrodes. In FIG. 5 the electrode arrangement on surface 61 is the same as that of FIG. 2. Thus two arrays 62 and 64 having a one-quarter wave offset between adjacent electrodes of respective arrays and are driven 90° out-of-phase through one pair of branches of quadrature hybrid 65 from devices I and II connected to the remaining pair of branches. Recognizing that the +1 lobe corresponds to a surface wave propagating in one direction along surface 61 and the —1 lobe in the other direction therealong, the coupling characteristic of devices I and II to these phases may be represented schematically by the vectors on FIG. 5. Thus device I, acting as a driving source, launches a wave propagating only to the left away from the array as represented by the pair of vectors 66—66. Similarly, as a receiving impedance, device I couples only to a wave arriving from the left as represented by the pair of vectors 67—67. Device II on the other hand can launch a wave propagating only to the right as represented by the vectors 68—68 and receives a wave arriving from the right as represented by the vectors 69—69. Obviously the more sophisticated array arrangements of FIGS. 3 and 4 may similarly be applied to surface wave transmission.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A transducer for launching a directed elastic wave comprising means for producing electric fields of a first phase in a first plurality of regions spaced along a line and of a second phase 90° or an odd multiple thereof removed from said first phase in a plurality of regions interposed between said first regions along said line and displaced one-quarter or an odd multiple thereof of the distance between adjacent first regions away from said first regions, and means interposed in said regions and responsive to said fields to produce elastic waves of vibration.

2. The transducer according to claim 1 including further means for producing electric fields of third and fourth phases in regions spaced along said line one-quarter or odd multiples thereof of said distance on either side of said second and first regions respectively, and first and second and third and fourth phases being 0° and 90° and 180° and 270° respectively.

3. The transducer according to claim 1 wherein the spacing between certain adjacent regions of different phases is three times that of the spacing between other adjacent regions of correspondingly different phases.

4. A transducer for launching a directed elastic wave comprising a body of piezoelectric material having a pair of opposite faces, and means for applying electric fields of a first phase to said body at a first plurality of points spaced by given distances along said faces and for applying electric fields in phases displaced by 90° or odd multiples thereof from said first phase at a second plurality of points spaced respectively from said first points by one-quarter or odd multiples thereof of said given distance.

5. A piezoelectric transducer for launching a directed elastic wave including waves of a given wavelength, said transducer having an electrode thereof in the form of a plurality of spaced conductive members interconnected as at least two interlaced arrays, adjacent conductive members of different arrays being spaced from each other by an odd multiple including one of one-quarter of said given wavelength and successive members of the same array being spaced from each other by an even multiple of one-quarter of said given wavelength, and means for exciting said arrays with voltages with respect to a common reference that is 90° out-of-phase.

6. A transducer for launching a directed elastic wave comprising a body of piezoelectric material having a pair of opposite faces, first electrode means upon one of said faces, second electrode means including a plurality of spaced conductive members upon the other of said faces, means for interconnecting said conductive members in at least two interlaced arrays, adjacent electrodes of different arrays being spaced from each other by an odd multiple including one of one-quarter of the spacing between successive electrodes of the same array, and means for exciting said arrays with voltages with respect to said first electrode that are 90° out-of-phase.

7. An elastic wave transmission system comprising a body of elastic wave propagation material having a pair of perpendicular faces, elastic wave transducer means including a body of piezoelectric material located upon one of said faces, said transducer having one electrode thereof in the form of a plurality of spaced conductive members upon said piezoelectric material, means for interconnecting said members as at least two interlaced arrays, adjacent electrodes of different arrays being spaced from each other by one-quarter of a given wavelength and successive electrodes of the same array being spaced from each other by an even multiple of one-quarter of said wavelength, means for exciting said arrays through a 3 db quadrature coupling circuit such that equal voltages are applied to said arrays that are 90° out-of-phase with respect to a common reference, and a second transducer means located upon the other of said faces.

No references cited.

ROY LAKE, *Primary Examiner.*

D. R. HOSTETTER, *Assistant Examiner.*